United States Patent Office 3,483,578
Patented Dec. 16, 1969

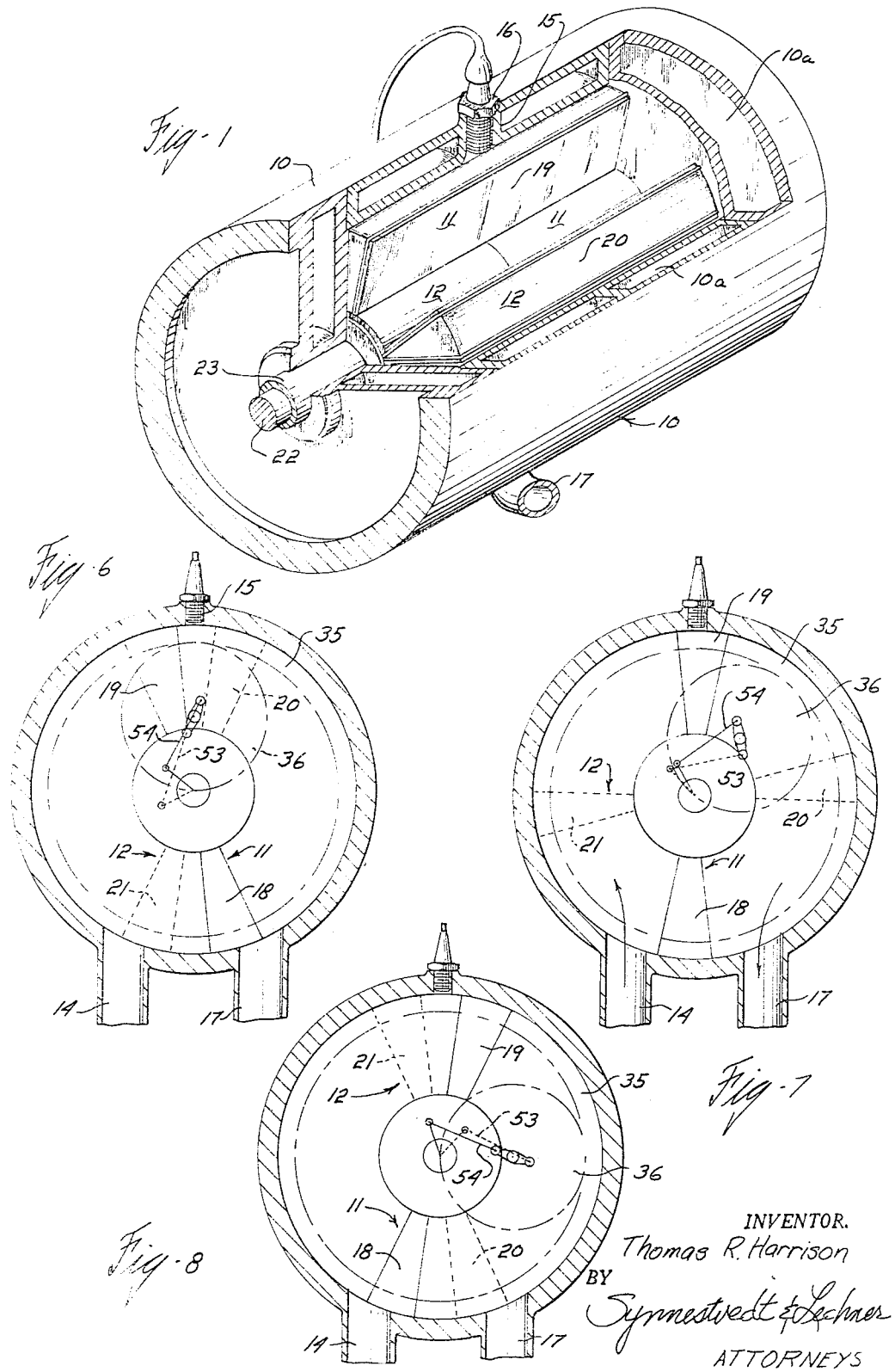

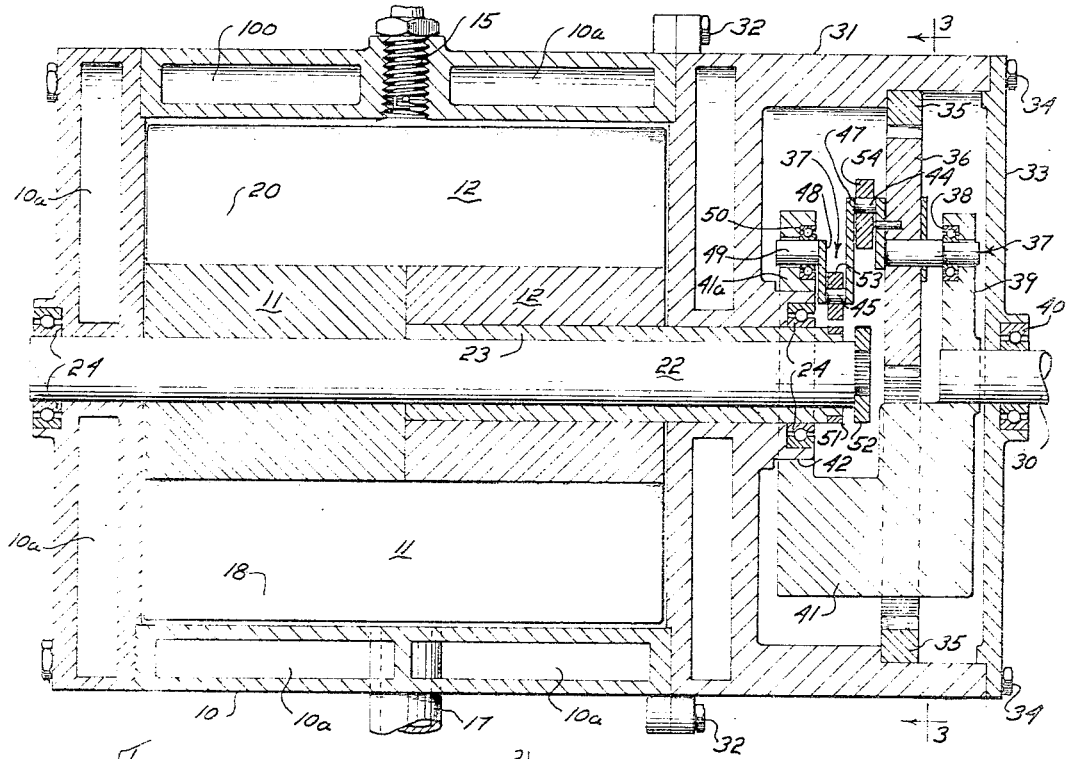
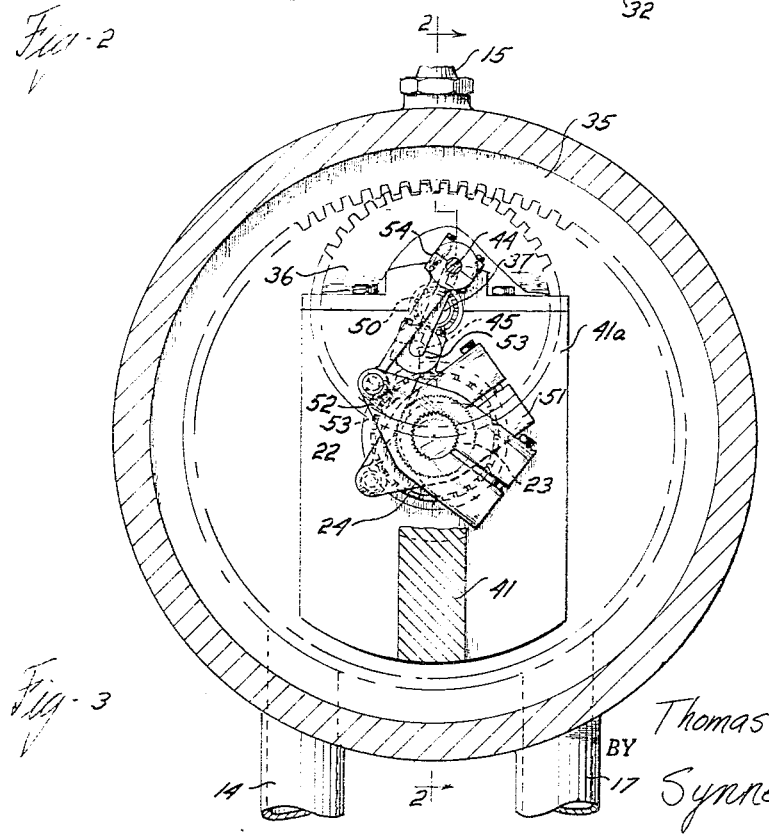

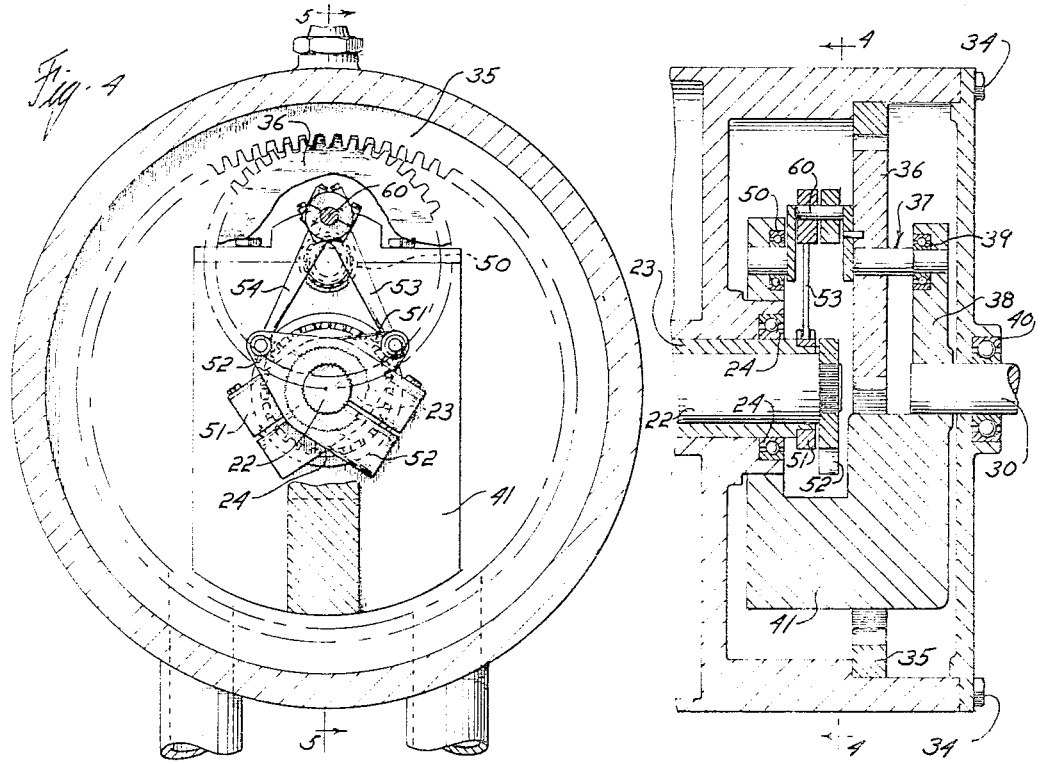

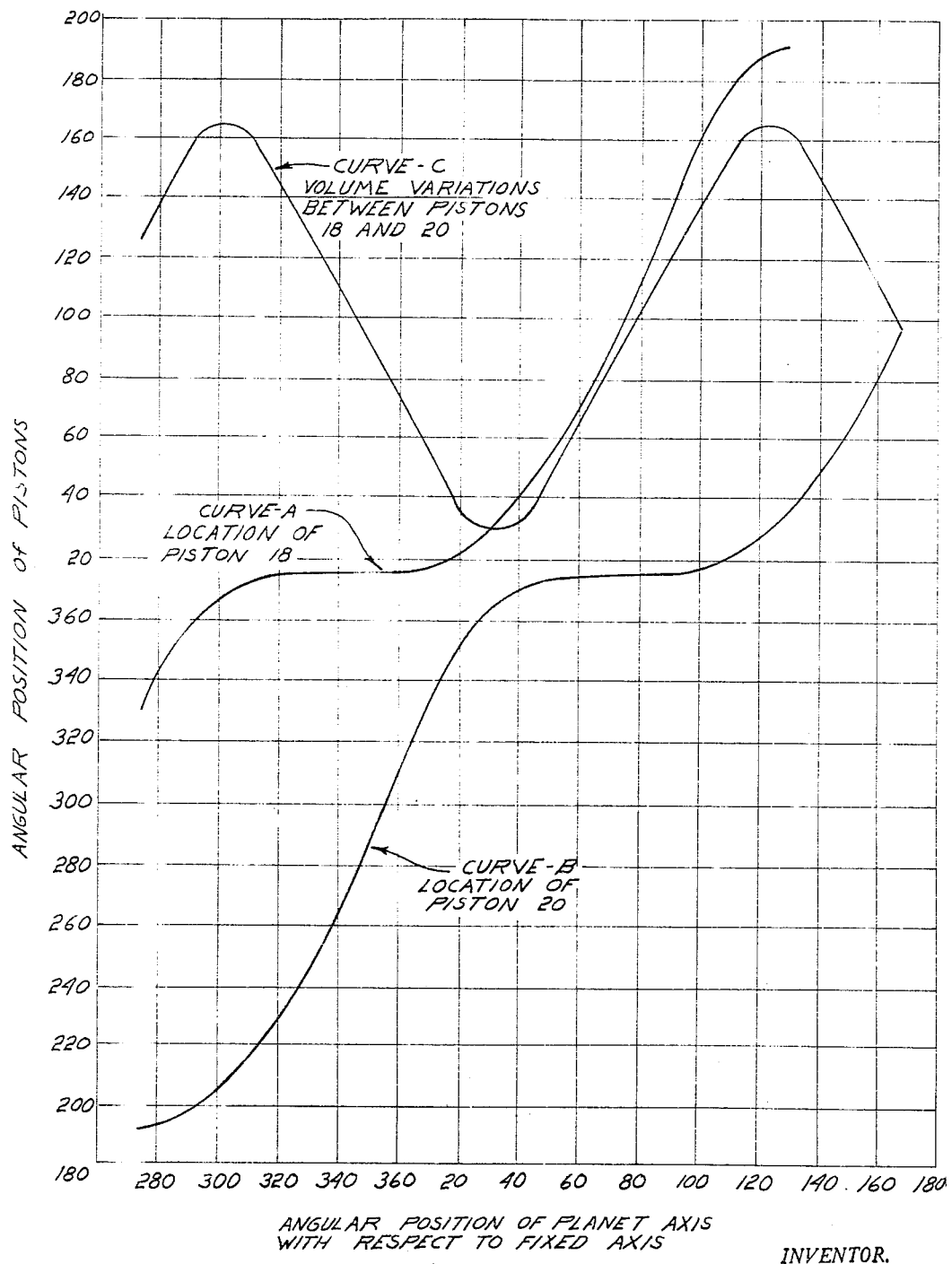

3,483,578
ROTARY ENGINE CONTROL MECHANISM
Thomas R. Harrison, 140 Hewitt Road,
Wyncote, Pa. 19095
Filed Aug. 17, 1967, Ser. No. 661,363
Int. Cl. F01c 17/06
U.S. Cl. 12.3—11                    11 Claims

ABSTRACT OF THE DISCLOSURE

Control mechanism for rotary piston type machinery, e.g. rotary internal combustion type engine, provides for movement of piston phasing links, each pivoted at one end to a crank pin which moves in an elliptical path around the engine axis. The opposite end of each link is pivotally connected to a lever rigidly associated with a pair of pistons to control piston movement. The crank pin is attached to a planet member that rotates one turn on its own axis in one direction as it revolves one turn in the opposite direction in its orbit about the axis of the engine to describe said elliptical path.

---

This invention relates to rotary piston machinery and more particularly to improvements in control mechanisms for phasing the operation of the rotary pistons in such machinery.

Although the present invention is suited for use in rotary piston pumps, the advantages inherent in its operation are particularly beneficial when the invention is incorporated in rotary internal combustion engines. Consequently, the following description will illustrate the principles of the invention by reference to such rotary engines.

As compared with current reciprocating internal combustion engines, the inherent advantages of rotary engines have long been recognized. These advantages include simplicity of design, the elimination of certain expensive parts such as valves and valve gears, and higher ratios of power to weight, economy of manufacture, operation and repair.

The present invention is primarily concerned with improvements in the type of rotary machinery typically having pairs of interconnected pistons which rotate about a common axis with a so-called scissors motion with respect to one another. In such machinery the pistons are either radially extending vanes or are sections of a toroid and follow each other around a continuous toroidal path. The present invention is applicable to both such forms of rotary piston machinery. In a typical case involving two pairs of integrally connected pistons, first one and then the other pair of pistons is held stationary or constrained to move slowly, while the other is free to rotate relatively thereto, thus providing for alternately contracting and expanding spaces between them. In the case of an internal combustion engine, a combustible fuel mixture is fed into the space between two pistons as they move away from each other and the fuel is then compressed as they move toward each other. At substantially maximum compression, ignition of the fuel mixture forces them rapidly apart. The trailing piston is held stationary and the leading piston moves forward until an exhaust port is uncovered. The trailing piston now becomes free to move forward, so that when they again move toward each other, the burned gases will be squeezed out. During the course of rotation through 360°, the four spaces between the pistons each expand and contract twice. In each space, during each cycle, a fuel mixture is taken in, compressed between the pistons and ignited. The expansion of the ignited fuel forces the pistons apart, after which they again move toward each other to exhaust the spent gases.

It can be appreciated from the foregoing that two pairs of pistons can function in a manner which is equivalent to that of a conventional eight cylinder, four cycle reciprocating engine. The compactness of the arrangement results in an exceptionally high power to weight ratio as compared with conventional reciprocating engines.

Despite the aforementioned and other advantages, rotary engines have not met with the success that might be expected. One of the principal reasons for this lies in the arrangement and operation of the phasing mechanisms or control mechanisms which control the relative movement of the pairs of pistons as they rotate within the cylindrical housing, and the primary object of my invention is the provision of an improvement in such mechanism.

A more specific object of the invention is the provision of phasing mechanism which permits maximum volumetric displacement.

A still further object of the invention lies in the provision of a rotary engine improvement which provides for good acceleration and deceleration characteristics of the pistons as compared with prior art rotary engines, and minimized shock load and wear on the phasing mechanism parts.

A still further object of the invention is the provision of phasing or control mechanisms which permit simplification of the operating structure with resultant economies in engine construction, operation and repair.

Basically considered, my invention lies in the provision of mechanism for controlling the operation of the pistons which includes phasing links or connecting rods pivotally connected to levers on the piston shafts. The ends of the links opposite the levers are controlled by mechanism which constrains each to move in an elliptical path about the axis of rotation of the pistons. An elliptical path is described by a crank pin carried by a planet member mounted so that its axis orbits in a circular path about the axis of rotation of the pistons, the planet being caused to rotate in the opposite direction on its own axis at a rate equal to its angular rate of revolution about the stationary axis in its orbital travel about the stationary axis. This relation of orbital and rotational movement of the planet member is produced by cooperation between teeth on the planet member circularly disposed about its axis and teeth on a toothed member mounted rigidly on the engine co-axially with the axis of rotation of the pistons. Preferably, the diameter of the pitch circle of the teeth on the toothed member is twice that of the teeth on the planet member. In the embodiment of FIGURES 2 through 5 the toothed member is a ring gear that forms an internally toothed sun gear, and direct meshing of these teeth and the teeth on the planet member provides the requisite cooperation. In FIGURE 9 the toothed membr consists of an externally toothed sprocket wheel and the cooperation is provided by a chain passing snugly around both members. Other arrangements, involving a stationary toothed member and orbiting planet member for producing elliptical motion will occur to those skilled in the art. When the foregoing considerations are met, the path of the crank pin will be an ellipse of suitable eccentricity when the distance from the crank pin to the planet axis (i.e. planet rotational axis) is radically less than the distance between the planet axis and the stationary axis (i.e. planet orbital axis). These considerations are developed more fully hereinafter.

The regular and gradual curving of the elliptical path, with its absence of peaks, waves or re-entrant loops, makes it especially suited for piston control purposes, since the crank pin controlling the motion of each piston pair will never halt or reverse its direction of travel. Instead, the pin (or pins) moves continuously and smoothly around the axis of the piston shaft and imparts the required scissors action to the pistons. The lengths of the phasing links and piston lever arms are so chosen that in alternate quadrants of the ellipse, when one end of a link successively approaches and passes away from a point on the ellipse, the opposite end rests at or near the center of curvature of the ellipse at that particular point. As the point is approached, the above-mentioned opposite end of the link will gradually slow down and then stand substantially stationary, and will remain so until the point is passed, after which it will begin to move again at a gradually increasing rate. Because that end of the link is connected to the end of a lever arm which is splined on the shaft which carries one of the piston pairs, this restraint of motion will be imposed upon that pair of pistons. Thus, each pair of pistons, alternately, will gradually decrease in velocity until it stops and, after a pause, will gradually gain speed. When both piston pairs are thus operated alternately so that one advances while the other is restrained, the requisite synchronization of piston movement as well as power transmission to the output shaft is achieved.

The manner in which the various objects and advantages of the invention are achieved, will become fully apparent upon reference to the following detailed description of illustrative embodiments of my invention, when taken in light of the accompanying drawings, in which:

FIGURE 1 is an isometric view, with portions of the structure cut away for illustrative purposes, showing the water-jacketed cylinder and pistons of rotary internal combustion engine of the type which incorporates the principles of my invention;

FIGURE 2 is a sectional view taken along line 2—2 of FIGURE 3, of the engine of FIGURE 1, illustrating a preferred phasing and transmission mechanism incorporating the principles of my invention;

FIGURE 3 is a sectional view taken along line 3—3 of FIGURE 2;

FIGURE 4 is a sectional view similar to FIGURE 3, but of a modified form of control mechanism;

FIGURE 5 is a sectional view of the structure shown in FIGURE 4, the section being taken along lines 5—5 of FIGURE 4;

FIGURES 6, 7 and 8 are diagrammatic views showing the structure in various positions of a cycle of operation of the mechanism shown in FIGURE 3;

FIGURE 9 shows a further modification of the control mechanism of the invention; and FIGURE 10 is a graphical presentation of the movements of certain portions of the mechanism and of the volumetric variations between a given adjacent pair of pistons.

Turning now to the illustrative embodiment of the invention, attention is first directed to FIGURES 1–3. Illustrated in those figures is an engine having a cylindrical housing 10 which encloses a cylindrical chamber in which two rotors 11 and 12, each consisting of interconnected diametrically opposed pistons, are mounted for rotation about a common axis. Cooling passages 10a through which a coolant is circulated, are built into the end walls and the cylindrical sidewall of the casting.

The chamber is provided with an inlet port 14 which is shown in FIGURE 3, an ignition port 15 in which a spark plug or other suitable device for igniting the fuel is mounted, and an exhaust port 17.

As is perhaps best shown in FIGURES 6 through 8, the rotor 11 is comprised of a pair of interconnected vanes or pistons 18 and 19, and rotor 12 is provided with vanes or pistons 20 and 21. Rotor 11 is fixedly mounted on a shaft 22, concentric with the axis of the cylindrical housing and the shaft is journalled for rotation within the chamber. Rotor 12 is mounted on a sleeve 23 which is rotatably mounted on the shaft 22. Support for the sleeve and shaft is provided by bearings 24, supported in bearing recesses in the end walls. By means of the foregoing, the two rotors are mounted for co-axial rotation about the axis of the cylindrical chamber and for relative rotational movement with respect to each other.

Each rotor is roughly U-shaped as may be seen from an inspection of rotor 12 in FIGURE 2. Each is dimensioned so that the faces of the pistons on one rotor completely overlap the faces of the pistons of the other. When rotated relatively to one another within the chamber, the enclosed spaces between them alternately expand and contact, thus allowing for the intake, compression, expansion and exhaust of gases between them. Suitable sealing means, such as "rings" are carried on the sides and top surfaces of the pistons to provide a substantially gas-tightseal with the walls of the chamber.

As stated above, the invention lies in the provision of improved mechanism for controlling the piston movement. As in the prior art, a pair of driving or phasing links is provided for controlling piston movement. Although these links may be pivotally connected to the pistons, as a practical matter, it is preferred that they be connected to levers which are connected thereto, as discussed hereinafter.

According to the invention, and in distinction to the prior practice, the other end of each of these links is constrained to orbit about the axis of the pistons in an elliptical path. In each alternate quadrant of its elliptical path, the crank pin and the attached end of a link will reach a portion of the curve within which the opposite end of the link is substantially at the center of curvature of that particular portion of its path. At that time, the link will pivot about that end which is at the center of curvature. This end of the link is pivotally connected to the piston rotor lever arm and will then restrain any motion of the attached pistons. When the link end moves away from that portion of the path, that pair of pistons is again free to move.

Certain of the advantages of this arrangement can be seen from an inspection of the curves shown in FIGURE 10. In this figure, the angular positions of two adjacent pistons are plotted against the angular position of the planet axis around the fixed axis. Curve A shows the location of piston 18 and curve B shows the location of piston 20. Both curves A and B illustrate the smooth transition from motion to pause and then from pause to motion during an operating cycle. It should also be noted that as one pair of pistons picks up speed, the other is slowing down at about the same rate, so that the sum of their inertias is held substantially constant, thus insuring freedom from vibration. The periods wherein both sets of pistons are in motion in the vicinity of minimum volume permit one piston to replace the other in its position in which it acts as a seal between the motor exhaust and intake ports during the respective pause periods of the two pistons. Curve C shows the variation in the volume of the space between pistons 18 and 20 as they rotate. Other pairs of adjacent pistons function likewise in succession.

Turning again to FIGURES 2 and 3, a preferred form of control mechanism for phasing the movements of the pistons and for transmitting their rotary motion to an output shaft 30 is shown. As can be seen from an inspection of FIGURE 2, the mechanism is located in a housing 31, the sidewalls of which are integrfal with one end of the cylinder housing 10 and which is held in place by means of bolts 32. An end plate 33 seals the end of housing 31 and is held in place by means of bolts 34 thus providing protection for, as well as access to, the mechanism.

In this embodiment, the mechanism for constraining the ends of the links to move in elliptical paths comprises a ring gear forming an internally toothed sun gear 35 fixedly mounted within the housing 31, co-axially with the shaft 22. Planetary gearing, preferably comprising a single planet gear 36 meshes with the teeth of the sun gear 35 and orbits about the sun gear axis. An important feature of this portion of the structure is that the planet gear 36 has a pitch diameter which is equal to one-half that of the sun gear 35. In this case, where the teeth of the planet gear and the teeth of the sung gear are in mesh with each other, the radius of the planet circuit is, therefore, equal to the distance between the axis of the planet gear and the axis of the sun gear. This gear arrangement constitutes one of the structures disclosed herein for producing the requisite relationship between the rotation and revolution of the planet member as specified above for producing an elliptical path.

As shown in FIGURES 2 and 3, planet gear 36 is fixedly mounted on a crank shaft 37, one end of which is journalled in a bearing 38 carried in an arm 39. The arm 39 is in turn secured to an output shaft 30 for rotation therewith, the shaft 30 being journalled in a bearing 40, mounted in the end plate 33. A counterweight 41 is integrally connected to the arm 39 on the end of the arm opposite the planet gear 36, and provides balance for the assembly comprising the arm, the crank shaft 37, the planet gear, and a suitable fraction of the weights of the phasing links. As is best shown in FIGURE 2, the counterweight has a second upstanding arm 41a, spaced from the arm 39 and extending generally parallel thereto. The arm 41a is provided with a bore 42 which is journalled for rotation on an arbor 42a, which is integral with the housing and wall. Parts 39, 41 and 41a, together, thus form a rigid U-shaped member. The entire assembly, comprising U-shaped member, planet gear 36 and crank shaft 37 rotate about the axis of the shafts 30 and 22.

The planet gear 36 is connected to the pistons by means of the phasing links which are pivotally connected to the planet gear by pivotal mounting means comprising a pair of crank pins 44 and 45 which are mounted on and form a part of crank shaft 37. As can be seen in FIGURES 2 and 3, the crank pins are located inwardly from the circumference of the planet gear on diametrically opposite sides of the gear axis, and at equal distances therefrom. The pitch diameter of the planet gear is one-half that of the internal sun gear and points located inwardly from the pitch circle of the planet will follow elliptical paths as the planet rotates with its teeth enmeshed with those of the internal sun gear. The major axes of the ellipses described by crank pins 44 and 45 are at right angles to one another.

In the illustrative embodiment and as seen in FIGURE 2, the crank shaft 37 comprises in part a pin 44 which is rigidly connected to a planet gear 36. Crank pin 45 is rigidly connected to the pin 44 by means of an arm 47 which interconnects the two crank pins so that they rotate as a unit with the planet gear about the axis of the crank 37. The other end of crank pin 45 is rigidly attached to an arm 48 on the opposite end of which is mounted the end 49 of the crank shaft 37. This end is journalled in a bearing 50. As can be seen from an inspection of FIGURE 2, bearing 50 is mounted on the arm-like extension 41a of counterweight 41.

A first phasing link 54 is pivotally mounted on crank pin 44 and has its opposite end pivotally connected to a lever 52 which is splined to the shaft 22. In like manner, crank pin 45 carries a phasing link 53 which is pivotally mounted thereon. The opposite end of the phasing link 53 is pivotally connected to a lever 51 splined to the end of the sleeve 23. Preferably, the splines are provided with flatted portions which serve to properly guide and locate the levers on the shaft and sleeve.

From the foregoing, it will be appreciated that orbiting of the planet gear about the fixed orbital axis (i.e., the axis of shafts 30 and 22), causes one end of each of the links 51 and 53 to follow an elliptical path. As explained above, the opposite end of the link will halt periodically and then rotate through an arc of about 180°. By the choice of appropriately dimensioned phasing links and lever arms and by appropriate location of the crank pin with respect to the planet gear axis, the extent of the periods of pause and motion can be readily selected.

The operation of an internal combustion engine equipped with the present invention will now be described so that the special advantages of the invention will be fully appreciated.

Attention is first directed to schematic views shown in FIGURES 6–8.

Referring first to FIGURE 6, when the pistons are in the positions shown, a gaseous mixture of combustible fuel has already been taken in between the pistons 19 and 21, a second charge of fuel has been compressed between the pistons 19 and 20, and a charge previously ignited is between the pistons 20 and 18 and is being exhausted through the exhaust port 17. Pistons 18 and 19 are becoming stationary because their phasing link (shown in full lines) is nearing a point at which it pivots about a center of curvature of a region of its elliptical path. When the fuel between pistons 19 and 20 is ignited, pressure is exerted on the faces of these pistons and they are forced apart. Since the phasing link connecting piston 19 (and 18) with the planet gear is in the position that restrains their motion, these pistons will be held approximately stationary. At the same time, the phasing link for piston 20 (and 21) is just leaving such a portion of its elliptical path. Inertia of the planet gear, its carrier, etc., aids in this advance. Consequently, the expansion of the gases causes piston 20 (and 21) to rotate rapidly in a clockwise direction. Motion of the pistons 20 and 21, caused by the expansion of gases, is transmitted to the planet gear 36 by link 53. The planet gear rotates on its shaft 37 and since it is enmeshed with sun gear 35, it orbits about the axis of the pistons. This orbiting movement is transmitted to the output shaft 30 by arm 39.

FIGURE 7 illustrates the parts as piston 20 moves in a clockwise direction and as the spent gases between the pistons 20 and 18 are being forced out through the exhaust port 17. At the same time, a charge of fuel is being sucked in through intake port 14 and a charge already taken in is being compressed between pistons 19 and 21.

Reference is next made to FIGURE 8 wherein planet gear 36 has rotated through one-quarter of a turn, the link 53 has now reached a point where one of its ends is near the center of curvature of the particular portion of the crank pin path. The pair of pistons comprising pistons 20 and 21 now halt in the position previously occupied by the pair 18 and 19, the end of the link for pair 18 and 19 now being in a position in which the ignition of fuel between pistons 21 and 19 will drive piston 19.

A modified form of the invention is illustrated in FIGURES 4 and 5. In these figures, the same reference characters are used to identify parts which are in all respects identical to those shown in FIGURES 1 through 3. As shown in FIGURE 5, the right hand end of shaft 22 and sleeve 23 are journalled in bearing 24. Lever 51 is shown fixed to the end of sleeve 23, and lever 52 is fixed to the end of the shaft 22. Phasing links 53 and 54 (see FIGURE 4) are pivotally mounted on the ends of the levers 51 and 52 respectively.

The opposite end of each of phasing links 53 and 54 is constrained to move in an elliptical path about the axis of the shaft 22 by means of a single crank pin 60. Crank pin 60 is fixedly connected to planet gear 36 at a point which is spaced inwardly from the pitch circle of the planet.

As in the embodiment described in FIGURES 1 through 3, the planet 36 meshes with sun gear 35 which is concentrically mounted with respect to the axis of shaft 22. The planet is fixed on a shaft 37 which is journalled for rotation on an arm 39 by means of bearing 38. Output shaft 30, journalled in a bearing 40, mounts the arm 39 and is fixedly secured thereto. Thus rotation of the planet about the axis of shaft 22 causes crank pin 60 and hence one end of each of links 53 and 54 that are pivoted thereto to follow an elliptical path. As is the case with the above described embodiment, the end of a link stops when it reaches a point which is the center of curvature of the part of the ellipse being traversed by the crank pin. This arrangement produces the proper phasing movement of the pairs of pistons in a manner which is, for all practical purposes, the same as that achieved in FIGURES 2 and 3.

The lengths of the levers, links, planet radius and distance of the crank pins from the planet axis can be obtained by a few trials. In the embodiments described above, satisfactory proportions are obtained by making the crank pin radial distance somewhere in the range of two-tenths to one-half of the distance between the sun gear axis (i.e. the orbital axis) and the planet axis. Two sets of such proportions that I have found favorable are as follows:

| Relative measurements | Set No. 1 | Set No. 2 |
|---|---|---|
| Distance between sun gear axis and planet axis | 1 | 1 |
| Length of piston lever arm | ½ | ⅝ |
| Length of phasing link center to center | 1 | 1 1/16 |
| Distance of crank pin from planet axis | ¼ | ⅓ |

In addition to the advantages of this mechanism, as already point out and illustrated in FIGURE 10, an additional advantage accrues, in the arrangements of FIGURES 2 through 5, from the relatively short distance from the planet axis to the crank pin as compared to the radius of the planet gear. This advantage may be seen from the following. The shock of an explosion between any adjacent pair of pistons is transmitted to the planet gear through amply proportioned piston lever arms, phasing links and crank pin or pins. Much of the shock is absorbed by opposing forces at the crank pins between the phasing links, by reaction at the planet axis, and by inertia of the planet gear and of the structure forming its mounting and counter-balance. Such shock as is transmitted to the teeth of the planet gear against those of the sun gear is minimized by the crank pin being much closer to the planet gear axis than it is to the teeth. This is a characteristic especially applying in the case of the elliptical path mechanism.

FIGURE 9 shows a further embodiment of the invention in which the mechanism for constraining the ends of the links to move in elliptical paths comprises a chain drive. Although other types of chains may be employed, I have chosen for illustration the roller-type chain 70.

According to the embodiment of the invention illustrated in FIGURE 9, a stationary toothed sprocket wheel 71 is concentrically mounted with respect to the axis of the shaft 22. The chain extends around, and meshes with the teeth of the sprocket 71 and a second sprocket 72, whose diameter is equal to one-half that of the sprocket 71. Sprocket 72 constitutes the previously discussed planet member. Although the pivotal mounting means for the phasing links may comprise two diametrically opposed crank pins, as shown in FIGURES 2 and 3, for simplicity of illustration, a single crank pin 73 is shown. This corresponds to the modified form shown in FIGURES 4 and 5. Phasing links 74 and 75 are pivotally mounted on the crank pin and the opposite ends of these are connected to the pairs of pistons via levers 76 and 77 on which they are pivotally mounted. The distance between the crank pin 73 and the axis of the planet member is dictated by the distance between the axis of the planet member and the fixed axis of its orbit and the same dimensional relationships apply as for the internally toothed sun gear and the orbiting planet gear of half the pitch diameter of the sun gear. The two sets of proportions of relative lengths of parts and distances given above apply equally for the embodiment shown in FIGURE 9. With equal proportions, the crank pin follows the same elliptical path with all of the disclosed embodiments of the invention. In common with the other embodiments, wear and failure caused by shock loads is minimized, but in this embodiment, this is accomplished in part in a slightly different manner, that is, the chain distributes load over a considerable number of teeth. In the chain drive arrangement, choice of a suitable number of chain links relative to he sprocket teeth causes each link to engage different sprocket teeth on successive trips around, thus distributing wear.

Each of the three preferred forms of the invention is quite effective in carrying out the various objects of the invention, providing for rotary engines with maximum volumetric displacement, good ecceleration and deceleration characteristics and minimized shock loads and wear on the various parts.

I claim:

1. In a rotary piston type machine having pairs of interconnected pistons, a housing for said pistons, each of said pairs being mounted for rotation within said housing about a common axis, said pairs of pistons being further mounted for relative rotational movement with respect to one another whereby alternately expanding and contracting chambers are formed between adjacent pistons, mechanism for synchronizing the rotational movements of said pistons comprising; a phasing link for each of said piston pairs, means rotatable with each of said piston pairs and spaced from the axis of rotation of said pistons for pivotally connecting one end of a link to a piston pair, and control mechanism connected to said links adjacent the opposite ends thereof for constraining said opposite ends to move in elliptical paths about the axis of rotation of said pistons.

2. Apparatus according to claim 1, wherein the mechanism for constraining movement of said opposite ends of said links in elliptical paths comprises; a planet member, means pivotally connecting said opposite ends of each of said links to said planet member, said planet member being mounted so that it orbits in a circular path about said common axis and means meshing with said planet member for causing rotation of the planet member about its own axis at a rate equal to its angular rate of movement as it orbits about the piston axis and in a direction opposite to the direcion of orbital movement.

3. Apparatus according to claim 2, wherein said means meshing with said planet member comprises an internally toothed gear.

4. Apparatus according to claim 3, wherein said means pivotally connecting said opposite ends of said links to said planet member comprises a single crank pin.

5. Apparatus according to claim 3, wherein said pivotal mounting means comprises a separate crank pin for each of said links, said crank pins being mounted on diametrically opposite sides of said planet gear axis.

6. Apparatus according to claim 3, wherein said pivotal mounting means comprises a separate crank pin for each of said links, said crank pins being symmetrically located about the axis of said planet member.

7. Apparatus according to claim 2, wherein said means meshing with said planet member comprises a flexible chain drive member, said planet member comprising a first sprocket wheel meshing with said chain drive member and a stationary sprocket wheel mounted co-axially with said common axis of said pistons, said stationary sprocket wheel having a pitch diameter equal to twice the pitch diameter of said first sprocket wheel and having teeth meshing with said chain drive member.

8. In a rotary internal combustion engine having a cylindrically shaped housing chamber, two pairs of interconnected vane type pistons within said chamber, said pairs being mounted for rotation about the axis of the cylindrical chamber, and further being mounted for relative rotational movement with respect to one another whereby alternately expanding and contracting chambers are formed between adjacent pistons, mechanism for synchronizing the rotational movements of said pistons comprising: a link for each of said pairs of vane type pistons, pivotal mounting means connecting one end of a link to a piston pair, control mechanism connected to the other end of the respective links for constraining such other end to follow an elliptical path, and an output shaft connected to said control mechanism, said control mechanism including an arm radially extending from said output shaft and causing rotation of said shaft upon movement of said links.

9. Apparatus according to claim 8, wherein said control mechanism includes an internally toothed gear, a planetary gear meshing with said internally toothed gear, having a pitch diameter equal to one-half of the pitch diameter of the internally toothed gear, and said arm rotatably mounting said planetary gear, said control mechanism further including link mounting means for the ends of said links, said link mounting means pivotally connecting said links to said planet gear and being rotatable with said planet gear and being located intermediate the pitch circle of the planet gear and the planet gear axis.

10. In a rotary piston type machine having interconnected piston pairs, each mounted for rotation about a common axis, said piston pairs being arranged and adapted for relative rotational movement with respect to one another whereby alternately expanding and contracting chambers are formed between adjacent pistons, phasing links respectively pivotally connected each to one of said piston pairs, the pivotal connections being equidistantly spaced from said common axis, and mechanism for constraining the opposite end of each of said links to move in an elliptical path about said common axis.

11. The construction of claim 10, wherein the said mechanism comprises a planet member, means mounting said planet member for rotary movement about its own axis and for orbital movement about said common axis and a stationary member coaxial with said common axis and being in driving relation with said planet member for causing rotation of the planet member about its own axis at a rate equal to its angular rate of orbital movement about said common axis and in an angular direction opposite to the direction of orbital movement, and pivotal mounting means for said opposite ends of said links, said pivotal mounting means being rotatable with said planet member and located at a radial distance from the axis of the planet member radically less than the orbital radius of the planet member.

References Cited

UNITED STATES PATENTS

| | | | |
|---|---|---|---|
| 1,568,052 | 1/1926 | Bullington | 123—11 |
| 2,349,848 | 5/1944 | Davids | 123—11 |
| 3,256,866 | 6/1966 | Bauer | 123—11 |
| 3,327,692 | 6/1967 | Keagle | 123—43 |
| 3,356,079 | 12/1967 | Rolfsmeyer | 123—11 |

LEONARD H. GERIN, Primary Examiner

U.S. Cl. X.R.

91—60